United States Patent [19]

Kerwin et al.

[11] Patent Number: 6,007,612
[45] Date of Patent: Dec. 28, 1999

[54] PIGMENT COMPOSITIONS

[75] Inventors: Paul Kerwin, Bridge of Weir; David McGregor, Glasgow; John Bryce Blackburn, Beith, all of United Kingdom

[73] Assignee: Ciba Specialty Chemicals Corporation, Tarrytown, N.Y.

[21] Appl. No.: 08/987,901

[22] Filed: Dec. 10, 1997

[30] Foreign Application Priority Data

Dec. 10, 1996 [GB] United Kingdom .................... 9625758

[51] Int. Cl.$^6$ ............................ C09D 11/08; C09D 11/02
[52] U.S. Cl. ...................................... 106/31.72; 106/31.65; 106/31.66; 106/31.67; 106/31.73; 106/31.8; 106/402; 106/496; 106/500; 106/504
[58] Field of Search ...................................... 106/402, 496, 106/31.6, 31.65, 31.66, 31.67, 31.72, 31.73, 31.75, 31.8, 31.89, 500, 504

[56] References Cited

U.S. PATENT DOCUMENTS

| 3,945,836 | 3/1976 | Miyata | 106/31.41 |
| 4,102,704 | 7/1978 | Fournier et al. | 106/496 |
| 4,155,773 | 5/1979 | Ferrill, Jr. | 106/31.69 |
| 4,698,099 | 10/1987 | Nakamura et al. | 106/402 |
| 4,793,863 | 12/1988 | Anantharaman et al. | 106/500 |
| 5,420,229 | 5/1995 | Burke et al. | 528/129 |
| 5,552,467 | 9/1996 | Reiter et al. | 524/270 |
| 5,820,667 | 10/1998 | Lu et al. | 106/413 |

FOREIGN PATENT DOCUMENTS

| 0544441 | 6/1993 | European Pat. Off. . |
| 0677556 | 10/1995 | European Pat. Off. . |
| 2133027 | 7/1984 | United Kingdom . |
| 2294469 | 5/1996 | United Kingdom . |

*Primary Examiner*—Helene Klemanski
*Attorney, Agent, or Firm*—David R. Crichton

[57] ABSTRACT

The present invention provides the use of a resinated pigment in which from 10 to 100% of the resinated proportion of the product is a resin ester, as colourant in a lithographic printing ink.

8 Claims, No Drawings

PIGMENT COMPOSITIONS

The present invention relates to pigment compositions suitable for use in lithographic printing inks.

Pigment compositions, for use in the manufacture of lithographic printing inks, normally contain additives to improve wetting and dispersion characteristics of the pigment in the ink vehicle. They may also modify other ink properties such as rheology and gloss. Such additives are typically rosins and modified rosins such as for example, hydrogenated resins, disproportionated resins and maleic modified resins. These are normally incorporated as their aqueous solutions in dilute alkali, during the pigment synthesis, then precipitated with the pigment by the addition of acid, a metal salt e.g. calcium, aluminium or a amine/quaternary ammonium salt.

However, with the advent of the replacement, for ecological reasons, of the lower aliphatic alcohols in the traditional fount solutions, by e.g. glycols, surfactants, etc., such pigment additives as described above can interfere with the lithographic printing process, disturbing the delicate aqueous/non-aqueous balance of the fount solutions and the ink, influencing fount pH instability.

Thus, when such pigments are used in lithographic inks it is found that the pH of the fount solution gradually rises significantly eg from typically about 5 up to 7 or even higher. When this happens, the ink and fount solution begin to mix and this causes poorer printing performance, e.g. print definition, especially when employing modern fast printing presses.

This phenomenon has been known for a few years and the use of an oil-soluble buffer has been proposed to reduce the pH drift in EP03 15844.

We have now found that the undesirable upwards pH drift of the fount solution can be significantly reduced or even eliminated by replacing the traditionally-used resin acids and salts by resins in which the carboxylic acid group(s) has been partially or fully reacted with alcohols, polyols or phenols to form insoluble resin esters. The resulting pigment compositions, as well as being readily incorporated into the lithographic ink, impart to the ink enhanced printing properties characterised by better fount/ink balance, reduced fount pH drift, and consequently, better ink transfer and print definition. Resin esters do not detrimentally affect the colouristic properties of the pigment and may improve such properties as rheology and gloss.

Accordingly the present invention provides the use of a resinated pigment in which from 10 to 100%, preferably from 40 to 100% by weight of the resinated proportion of the product is a resin ester, as colourant in a lithographic printing ink.

The base pigments to which this invention relates are any of those which may be employed in lithographic inks, e.g. azo lake pigments such as Pigment Reds 48, 52, 53, 57, diarylide pigments such as Pigment Yellows 12, 13, 14 and Pigment Orange 34 and phthalocyanines such as Pigment Blue 15:3.

The resin esters employed may be e.g. esters of rosin acids, or of modified (hydrogenated, disproportionated, maleated, polymerised, phenolic modified) rosins acids. The alcohols used for esterification may typically have from 1 to 20 carbon atoms and be optionally substituted with such groups as halogen, e.g. chlorine, or amino groups. Suitable polyols may have from 2 to 10 OH groups such as glycerol and pentaerythritol. Suitable phenols include phenol itself and cresol.

Optionally, other additives such as surface active agents may be added to aid the pigment synthesis in accordance with known technology. Such agents may include non-ionic, anionic, amphoteric and cationic surfactants, e.g. ethoxylated-alcohols, -phenols, -acids, -amines, rosin and modified rosin acid salts, alkyl sulphates, alkyl sulphosuccinates, alkyl aryl sulphonic acids, amine and quaternary ammonium salts. However, care has to be exercised in choice of type and quantity of such auxiliaries to ensure that their use does not negate the value of the main additive, the resin ester.

The pigment product is used in a lithographic ink. Vehicles for such inks include aromatic petroleum hydrocarbon resins, alkali-refined linseed oil, pentaerythritol esters of phenolic modified rosins, maleic acid—modified rosin ester and mixtures thereof with each other and with tung oil.

The invention also provides a lithographic printing ink comprising a lithographic printing ink vehicle and, as colourant, a resinated pigment in which from 10 to 100% preferably from 40 to 100% by weight of the resinated proportion of the product is a resin ester.

The invention is illustrated by the following Examples.

EXAMPLE 1

35.9 g of 4amino toluene-3-sulphonic acid (98.2%) are dissolved in 265 ml of water using 16.2 g of 47% sodium hydroxide liquor with stirring. The temperature of the solution is reduced to 0–5° C. by ice addition before adding 12.2 g of sodium nitrite which has previously been dissolved in 50 ml of water. 38 ml of concentrated hydrochloric acid (35%) is added to the solution with stiring to form the diazo salt. The volume of the suspension is adjusted to 750 ml at 0–5° C. by ice addition.

9.5 g of a disproportionated abietic acid rosin (trade name 'Recoldis A' and supplied by Langley Smith and Co.) are dissolved in 240 ml of water with 2.6 g of sodium hydroxide liquor (47%) by heating to 80° C. with mechanical agitation. Once a resin solution is obtained, the solution is cooled to 50° C. by addition of 240 ml water. 30 g sodium hydroxide liquor (47%) and 35.5 g of beta hydroxy naphthoic acid (BONA) are added with mechanical agitation continuing. 19 g of a 50% w/w resin ester dispersion known as Tacolyn 153 and supplied by Hercules BV are added to the solution. The volume of the dispersion is adjusted to 800 ml at 0–5° C. by ice addition.

The diazo component is added to the resin/resin ester/BONA suspension over a period of 40 minutes with mechanical agitation and maintaining a temperature of 0–5° C. and a pH of 10.8–11.

After the coupling process is complete, the suspension is stirred for a further 15 minutes at the above conditions before adding 33.2 g of calcium chloride (80%). The suspension is held under the above conditions for 30 minutes in order to ensure full laking. The pH of the suspension is adjusted to 7.0 using dilute hydrochloric acid (10%) before steam heating to 80 ° C. The suspension is flushed to 65° C. and filtered and washed salt free. The product is dried overnight at 90° C. before grinding to a powder.

20 g of the finished powder is incorporated into 80 g of an ink varnish consisting of 1 part distillate (known as PKWF 4/7 New and supplied by Halterman), 2 parts resin (known as Sparkle 93 and supplied by Lawter International) and 3.25 parts gelled hard resin (known as Luminex 55 and supplied by Lawter International). Mixing is performed on the back rolls of a Buhler SDY-200 3 roll mill at 23° C. and 10 bar pressure for 5 minutes. The mixture is then given 3×10 bar passes over the three roll mill at 23° C. (with 2 minutes back roll mixing between each pass) before let-down to 18% pigmentation using a muller apparatus, with more ink varnish.

The sample shows comparable colour strength, significantly improved gloss and significantly improved low shear flow when compared to a standard (resin ester free) pigment as described in Example 4.

The effect of this ink on pH drift of a fount solution used in a lithographic printing process is assessed according to the following method. 50 g of the ink is placed in a plastic container together with 150 mls of a standard fount solution (Fountsol F5, supplied by Inkland Ltd) and a VOSS dual-paddle mixer is used to agitate the mixture (150 rpm) for a period of 1 hour. The fount solution is separated from the ink and the pH measured. The results are recorded in Table 1. This sample shows a significant improvement in pH drift in comparison to an ink comprising resin ester free pigment (Example 4).

EXAMPLE 2

A pigment is prepared as in Example 1, except that 3.8 g of Recoldis A rosin are solubilised with 1.04 g of sodium hydroxide liquor (47%) and 30.4 g of Tacolyn 153 resin ester dispersion is used.

When incorporated into a heatset ink varnish and tested as in Example 1, this sample shows equivalent colour strength, significantly improved gloss, low shear flow and reduced pH drift (table 1) when compared to an ink comprising a resin ester free pigment (Example 4).

EXAMPLE 3

A pigment is prepared as in Example 1 except that no Recoldis A resin is used, but rather 38 g of Tacolyn 153 (50% w/w) resin ester dispersion is incorporated into the product. When this powder is incorporated into a heatset varnish as in Example 1, the final ink shows equivalent strength and significantly improved gloss, low shear flow and reduced pH drift (Table 1) when compared to an ink comprising a resin ester free pigment (Example 4).

EXAMPLE 4

A pigment is prepared as in Example 1 except that 19 g of Recoldis A rosin is solubilised with 5.2 g of sodium hydroxide liquor (47%) and no resin ester is incorporated in the product. The pH drift results of an ink prepared as in Example 1, but using this product are recorded in Table 1.

TABLE 1

| pH drift of fount solution after stirring with ink for one hour using a VOSS dual-paddle mixer: | | | | |
|---|---|---|---|---|
| | Example 1 | Example 2 | Example 3 | Example 4 |
| Initial pH | 4.6 | 4.6 | 4.6 | 4.6 |
| Final pH | 5.8 | 5.7 | 5.7 | 7.6 |
| Drift | +1.2 | +1.1 | +1.1 | +3.0 |

We claim:

1. A process for reducing the upwards pH-drift of a fount solution of azo lake pigments which comprises replacing resin acids and salts by resins in which the carboxylic acid group(s) has been partially or fully reacted with alcohols, polyols or phenols to form insoluble resin esters.

2. A process according to claim 1, in which the resin ester is derived from a rosin by esterifying a free acid group on the rosin with an optionally substituted alcohol.

3. A process according to claim 1, in which the resin ester is derived from a rosin by esterifying a free acid group on the rosin with glycerol or pentaerythrytol.

4. A process according to claim 1, in which the rosin is a wood rosin, a tall oil rosin or a product derived from these by hydrogenation, disproportionation, polymerization or by reaction with an organic reactant.

5. A process for preparing a lithographic printing ink composition comprising combining a lithographic printing ink vehicle and, as a colorant, a resinated pigment wherein the improvement comprises using a resinated portion of the composition that contains from 40 to 100% by weight of a resin ester.

6. A process according to claims 5, in which the resin ester is derived from a rosin by esterifying a free acid group on the rosin with an optionally substituted alcohol.

7. A process according to claim 5, which the resin ester is derived from a rosin by esterifying a free acid group on the rosin with glycerol or pentaerythrytol.

8. A process according to claim 5, in which the rosin is a wood rosin, a tall oil rosin or a product derived from these by hydrogenation, disproportionation, polymerization or by reaction with an organic reactant.

* * * * *